March 13, 1951     H. CONVISER     2,545,343
ELECTRIC MOTOR CONTROL SYSTEM
Original Filed Feb. 18, 1946     3 Sheets-Sheet 1
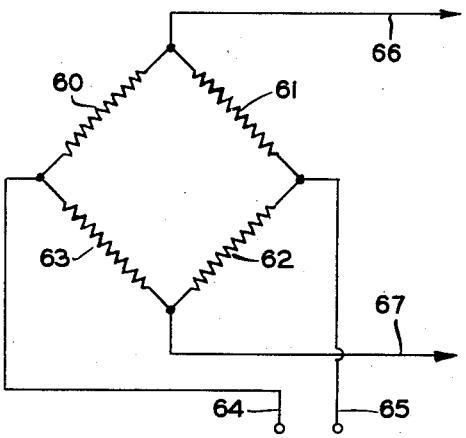
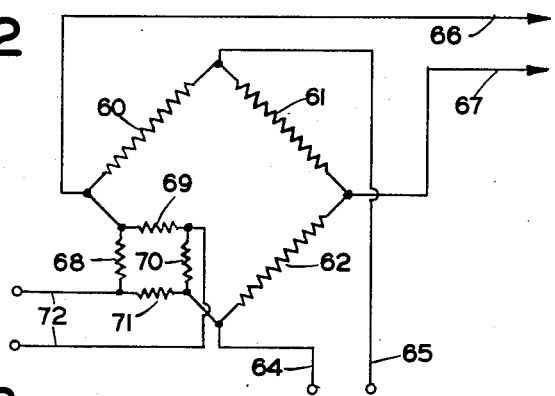
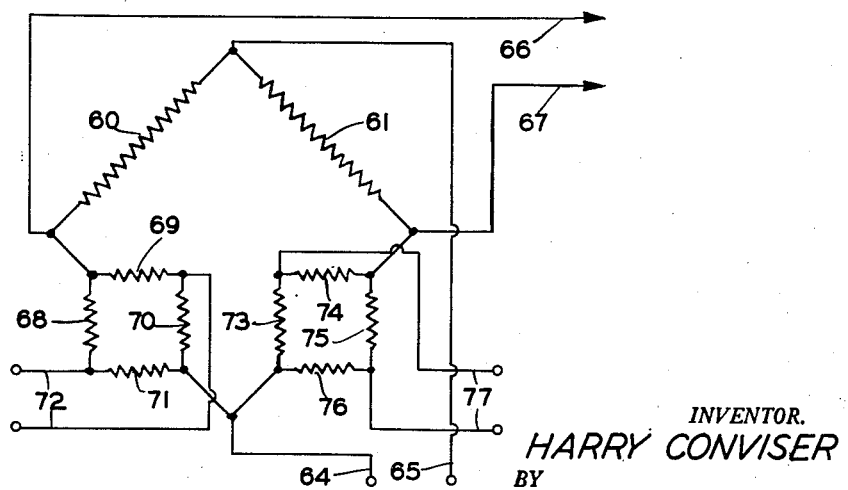
INVENTOR.
HARRY CONVISER
BY
-ATTORNEY.

March 13, 1951     H. CONVISER     2,545,343
ELECTRIC MOTOR CONTROL SYSTEM
Original Filed Feb. 18, 1946     3 Sheets-Sheet 2
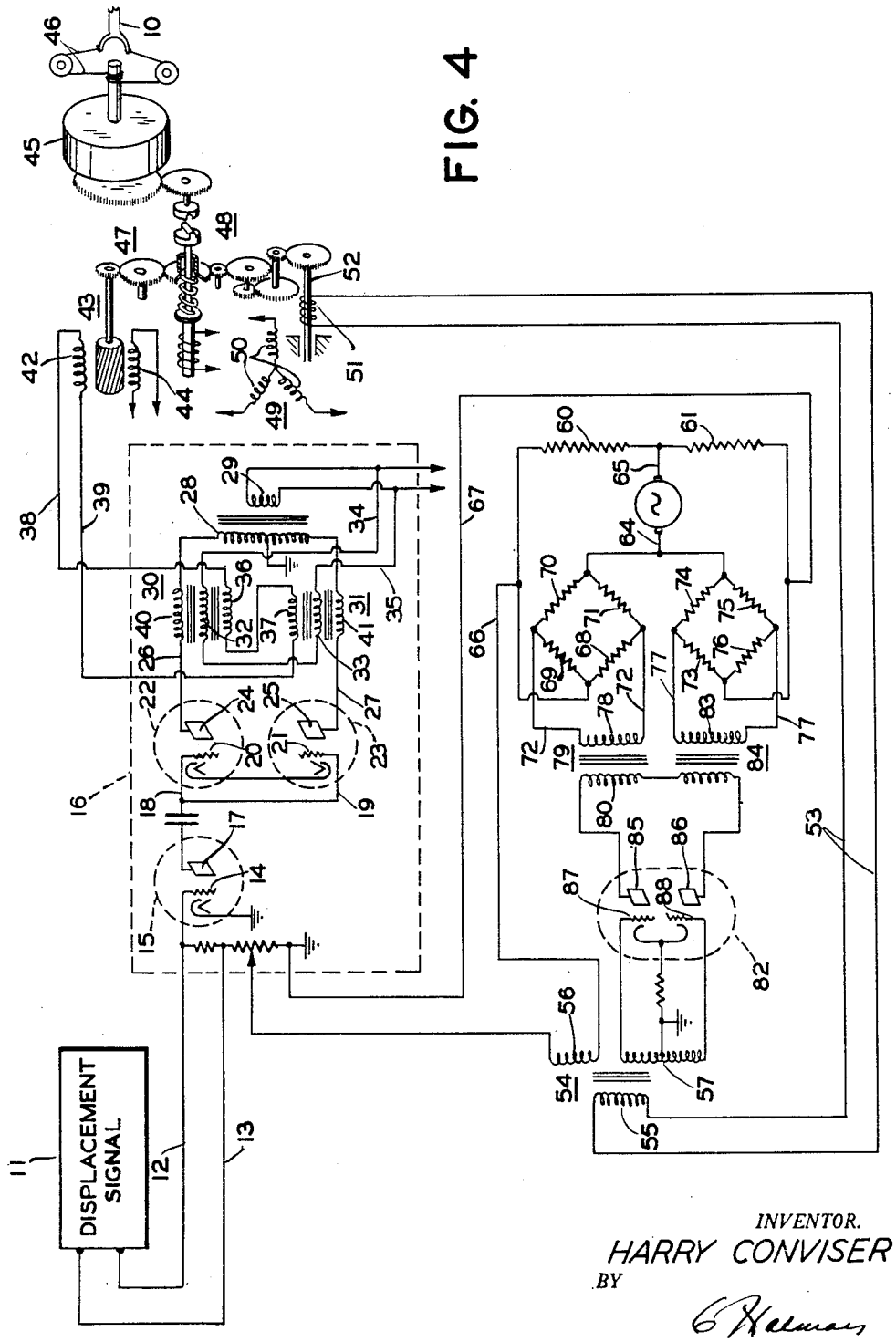
INVENTOR.
HARRY CONVISER
BY
-ATTORNEY- March 13, 1951 H. CONVISER 2,545,343
ELECTRIC MOTOR CONTROL SYSTEM
Original Filed Feb. 18, 1946 3 Sheets-Sheet 3

INVENTOR.
HARRY CONVISER
BY
- ATTORNEY -

Patented Mar. 13, 1951

2,545,343

UNITED STATES PATENT OFFICE 2,545,343

ELECTRIC MOTOR CONTROL SYSTEM

Harry Conviser, Ardsley, N. Y., assignor to Bendix Aviation Corporation, Teterboro, N. J., a corporation of Delaware Original application February 18, 1946, Serial No. 648,490. Divided and this application April 20, 1949, Serial No. 88,657

5 Claims. (Cl. 318—489)

This invention relates generally to control systems such as automatic steering systems for air or water craft, for example, and constitutes a division of my application Serial No. 648,490, filed February 18, 1946 now Patent Number 2,487,697 issued November 8, 1949.

Control systems of this general character are represented by copending application Serial No. 562,823, filed November 10, 1944, issued December 2, 1947 as U. S. Patent No. 2,432,036, and are adapted for use with automatic steering systems for aircraft, such systems embodying a thermal delay coupling device, operating on a heat exchange relation for providing, when used in connection with direction, direction rate, bank or pitch displacement signals, automatic trim functions or, when used in connection with rudder, aileron or elevator follow-up signals as an antihunting expedient. When a craft, provided with such a system, was subjected to a persisting displacement signal, the thermal delay coupling was operative to provide an average displacement signal supplied to the particular control surface being considered for returning to and maintaining the craft in a reference position whether in azimuth or in attitude.

The system described in the copending application relied primarily upon a heat exchange principle so that a relatively long period was injected between the response of one circuit to the operation of a second circuit. In some instances, it is desirable to provide a time delay coupling having a more rapid time constant than that of the copending application and to this end the novel system of the present invention is provided which constitutes an improvement over the aforementioned copending application.

An object of the present invention, therefore, is to provide a novel control system utilizing a time delay coupling device possessing a rapid time constant interposed between a controlled and a controlling apparatus.

Another object of the invention is to provide a novel thermal time delay device having a rapid time constant.

A further object is to provide a novel control system adapted for use with automatic steering systems for mobile craft whereby the latter will be reliably maintained substantially on a prescribed course and/or in a predetermined attitude.

Another object of the invention is to provide a novel automatic steering system for mobile craft, adapted for suppressing hunting thereof about any or all of its axes of control whereby dead beat operation of the craft is obtained and/or adapted for returning and maintaining a craft substantially in datum after a change in displacement due to a change in load moment.

A further object is to provide a novel antihunting provision in the nature of an error averaging mechanism having a rapid time constant for an automatic steering system for mobile craft whereby the craft will be provided with proper dampening about any one or all of its control axes.

Another and further object is to provide a novel and relatively simple automatic trim arrangement for automatic control systems for mobile craft.

A further object is to provide a novel time delay device having a rapid time constant and operating on a temperature rise rather than a heat transfer or exchange principle.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention.

In the drawings wherein like reference characters refer to like parts throughout the several views, Figure 1 is a wiring diagram of a conventional Wheatstone bridge circuit;

Figure 2 is a wiring diagram of the main bridge circuit of Figure 1 with the resistor of one arm thereof replaced by a second control bridge circuit;

Figure 3 is a view similar to Figure 2 with two adjoining arms of the main bridge comprising two control bridge circuits;

Figure 4 is a diagrammatic illustration of an automatic steering system for one control axis of a mobile craft incorporating the novel subject matter of the present invention in the follow-up channel thereof.

Figure 5:
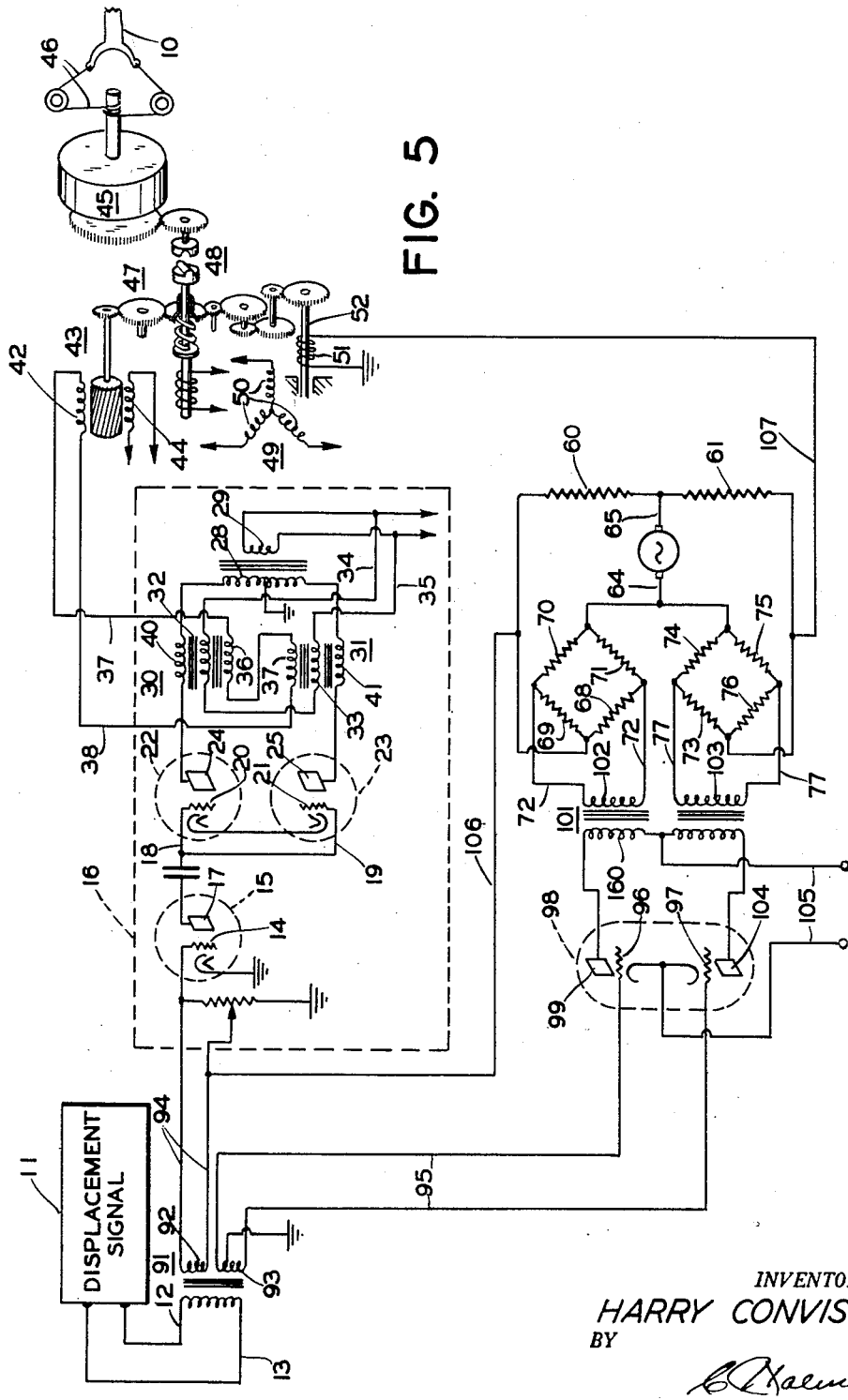
Figure 5 is a view similar to that of Figure 4 having the novel provision of the present invention applied to the displacement channel thereof.

Referring now to the drawings for a more detailed description and more particularly to Figure 4 thereof, the novel delay coupling of the present invention is shown applied to an automatic pilot of the general character shown and described in copending application Serial No. 516,488, filed December 31, 1943. The displacement signal for controlling the position of a control surface 10 is derived from a signal generating device, generally designated with the reference character 11, which device may comprise the gyro stabilized magnetic pick-up device of the latter application where the present invention is applied to automatic rudder trim or which may comprise the electrical pitch or bank take-off of the aforementioned application where the invention is applied to automatic elevator or aileron trim.

As more fully described in copending application Serial No. 516,488, the displacement signal is fed by generator 11 through conductors 12 and 13 to the grid 14 of a tube 15 of a servo amplifier 16. Plate 17 of tube 15 connects through parallel conductors 18 and 19 with grids 20 and 21 of tubes 22 and 23, the plates 24 and 25 of the latter tubes being connected by way of conductors 26 and 27 with a split secondary winding 28 of a transformer whose primary winding 29 connects with a suitable source of alternating current (not shown) such as the craft's power supply.

Magnetic reactors 30 and 31 are provided between each plate 24 and 25 and its related connection with secondary winding 28. Each of the reactors comprises a soft iron core (not shown) having primary windings 32 and 33 connected in series with each other and with the current source through leads 34 and 35 which may be tapped to the leads feeding primary winding 29. Furthermore, each reactor is provided with a secondary winding 36 and 37 which are connected in series opposed relation and have output leads 38 and 39. In addition to the primary and secondary windings, each reactor is provided with a saturating winding 40 and 41 connected with leads 26 and 27.

Output leads 38 and 39 of the series opposed secondaries connect with one phase winding 42 of a two phase motor 43, whose second or fixed phase winding 44 is connected with the craft's source of power. Motor 43 is adapted for driving a servomotor 45, connected through cables 46 with control surface 10, through a gear reduction system 47 and a normally engaged solenoid operated clutch 48.

With the craft in a predetermined attitude, with no apparent deviation about its pitch axis, for example, the signals at grids 20 and 21 from generator 11 are at zero so that the network is balanced and the current at output leads 38 and 39 of the reactors is zero because secondaries 36 and 37 are in series opposed relation so that induced currents in one secondary balance the induced currents in the other secondary.

Upon the occurrence of a deviation from a predetermined attitude a signal will be developed by generator 11 which may be considered to be passing from zero to a positive maximum value at grids 20 and 21 of tubes 22 and 23. Assuming that, at that moment, the current at plate 24 of tube 22 is passing from zero to a positive maximum value, the current at plate 25 of tube 23 will be passing from zero to a negative maximum value so that no current will flow in saturating winding 41. Current, however, of a pulsating character will flow at lead 26 and, therefore, within saturating winding 40 as a result of which the core of reactor 30 will become saturated so that currents induced in secondary 36 will be decreased causing network unbalance and creating current flow in one direction within leads 38 and 39 to energize motor 43.

If craft deviation is in a direct opposite to that above described, the signal from generator 11 impressed on grids 20 and 21 will be of such a character that it will pass from a zero to a negative maximum value so that no current will flow at plate 24 but will flow at plate 25 and within lead 27. In such event, the core of reactor 31 will become saturated thereby decreasing the currents induced within secondary 27 and the network will again become unbalanced whereby currents will flow at leads 38 and 39 in an opposite direction to reverse the operation of motor 43.

In order to prevent overcontrol of surface 10 and also to impart stability to the craft to prevent oscillation thereof, an electrical follow-up system is provided in the nature of an inductive device 49 comprising a wound stator 50 energized from the craft source of supply and an inductively coupled wound rotor 51 which is mounted by a shaft 52 for angular motion by motor 43, the driving connection between the motor and the rotor being a permanent one and independent of whether or not clutch 48 is engaged or disengaged. Normally, rotor 51 is maintained in a null position, i. e., one in which the electrical axis of the rotor winding is normal to the resultant magnetic field at that stator. Motion from the null position on the part of rotor 51, during operation of motor 43, causes the inducement of a signal within the rotor winding which is led off and impressed upon grid 14 of tube 15 by way of conductors 53 and a transformer 54, having a primary 55 and a split secondary 56 and 57 the purpose of which will hereinafter appear. The signal generated within rotor 51 is in opposition to the displacement signal within generator 11 and increases with increased motion of surface 10 until a given point is reached, at which time the signal of rotor 51 is exactly equal and opposite to the displacement signal to thereby "wash out" the displacement signal at which time motor 43 is de-energized and control surface 10 has attained a deflected position proportional to the displacement signal.

With the surface 10 in its applied position and motor 43 de-energized, the craft begins to return to its prescribed reference. In doing so, the displacement signal developed by generator 11 starts to diminish in value while the follow-up signal of rotor winding 51, being at a maximum, becomes predominating and energizes motor 43 in a reverse direction to start bringing surface 10 back to a neutral position, motor reversal being determined by current flow in an opposite one of saturating windings 40 or 41 to the one having current flow therein upon initial craft departure from datum as explained above. With reverse motor operation, the signal in rotor 51 diminishes until the rotor attains its null wherein, unless another displacement signal originates at generator 11, the control surface and generator will be in synchronism. For further stability and prevention of overcontrol, a rate of displacement signal may be utilized in addition to the displacement signal for controlling surface 10 in the manner fully described in copending application Serial No. 516,488.

As pointed out in copending application Serial No. 562,823, now Patent Number 2,432,036, undercontrol will occur in the steering system described in the event of a load change so that the craft will not be returned to datum but to some attitude parallel to datum. This means that the original trim adjustment which maintained the craft in datum is no longer satisfactory for the new condition due to load change. By means of the present invention a novel arrangement is provided which provides the necessary additional signal for automatically supplementing the original trim adjustment to return the craft substantially to datum.

In place of the heat exchange or transfer device of copending application Serial No. 562,823, now Patent Number 2,432,036, there is provided by the present invention a novel time delay coupling utilizing a temperature change principle thereby having a more rapid time constant than devices heretofore known of this character. For a better understanding of the present invention, reference is made to Figure 1 of the drawings where four resistors 60, 61, 62 and 63 are shown arranged in a conventional Wheatstone bridge circuit. The resistors are of equal value so that if a voltage is applied to the bridge across conductors 64 and 65 no voltage will appear at conductors 66 and 67 since these points are of equal potential. Conversely, if a voltage is applied at conductors 66, 67 no voltage will appear at conductors 64, 65. It has been discovered that two voltages of similar or widely varying magnitude, frequency and/or wave form may be simultaneously applied across conductors 64, 65 and 66, 67, respectively, without any interaction or frequency or phase distortion.

In conformance with this characteristic, one arm of the bridge of Figure 1 constituted by resistor 63, for example, may be replaced, as shown in Figure 2, by four equal heat-responsive resistors 68, 69, 70 and 71 arranged in a bridge which may constitute an auxiliary or control bridge for the main bridge. Opposite corners of the control bridge are connected by way of conductors 72 to a source of signal voltage and with the appearance of a signal across conductors 72 current will flow through the four arms of the control bridge but no interaction will result between that current and the current of the main bridge. Current flow in the control bridge, however, manifests itself in a temperature rise in the arm of the main bridge constituted by the control bridge to thereby unbalance the main bridge whereupon current from conductors 64 and 65 will flow at conductors 66 and 67.

By further replacing resistor 62 of the bridge of Figure 1 with four equal heat-responsive resistors 73, 74, 75 and 76 arranged in the form of a second auxiliary or control bridge as shown in Figure 3 and connecting opposite corners of the latter control bridge by way of conductors 77 to a source of signal voltage, the direction of current flow at output conductors 66, 67 of the main bridge may be reversed depending upon whether signal voltages are applied to conductors 72 or 77 of the control bridges. In this manner, by applying a direct current, or rectified current, pulse, square wave or distorted wave of any frequency to conductors 72 or 77 of the control bridges, a sine wave or any other desired wave form may be controlled at the main bridge in magnitude and/or polarity. The general arrangement of Figure 3 thus constitutes a time delay device constituting the subject matter of the present invention having a rapid time constant and adapted for use wherever a definite time lag is desired between a controlled circuit in its response to the operation of a controlling circuit. If desired, moreover, the two control bridges may be arranged and constructed in the form of a sealed or vacuum tube as shown in copending application Serial No. 648,449, filed February 18, 1946, now Patent No. 2,525,179.

For purposes of providing an automatic trim provision for the steering system hereinabove described, the novel time delay device hereof is shown in Figure 4 as applied to the follow-up channel of the system. To this end, conductors 72 of one control bridge are connected across a secondary 78 of a transformer 79 whose primary 80 is in circuit with a plate 81 of a dual triode tube 82 while conductors 77 of the second control bridge are connected across a secondary 83 of a transformer 84 whose primary 85 is in circuit with a plate 86 of tube 82. Grid 87 of the tube is connected with one end of secondary winding 57 of transformer 54 while grid 88 is connected with the opposite end of the secondary, the latter being center tapped and grounded as shown. Output conductor 67 of the main bridge is connected to grid 14 of tube 15 while output conductor 66 is connected to one end of secondary winding 56, the other end of which, likewise, connects with grid 14.

For a single and minor displacement of the craft from course or attitude a signal is developed by generator 11 and amplified to energize motor 43 whereby control surface 19 is actuated to change craft course or attitude. Operation of motor 43 displaces rotor winding 51 of the inductive follow-up device to develop a follow-up signal therein which is communicated through leads 53 and transformer 54 through secondary 56 thereof to be impressed upon the displacement signal at grid 14. Even though some signal is communicated to grids 87 and 88 of tube 82 it is insufficient to make the time delay coupling effective.

If, on the other hand, the displacement is of a persisting character, current flow develops at plate 81 or 86, depending upon the direction of the follow-up signal, to provide a signal at either secondary 78 or 83 to provide current flow at control bridge conductors 72 or 77. The temperature of the control bridge receiving the current rises to thereby unbalance the main bridge whereupon current from the source feeding conductors 64 and 65 flows at output conductors 66 and 67 to be impressed upon the displacement and follow-up signal at grid 14 of tube 15. The action of the time delay coupling is of such a character as to develop a further or average displacement signal whereupon the craft is returned to its datum in the face of the existence of the persisting displacement signal.

While the arrangement has been illustrated and described hereinabove in connection with the follow-up signal channel to provide automatic trim control, it may be applied equally as well directly to the displacement signal channel where it will act in the nature of a differentiation mechanism to impress upon the displacement signal a corrective signal which will apply a dampening factor to prevent craft hunting, such application being adapted for use with any one or all of the three axes of craft control. To this end the arrangement of Figure 5 is provided which comprises substantially the automatic control of Figure 4 in that normally a displacement signal originating in generator 11 is impressed upon grid 14 of tube 15 and ultimately energizes servomotor 43 to operate control surface 10. In response to servomotor operation, a follow-up signal is developed at rotor winding 51 to be impressed upon the displacement signal substantially in the manner described in connection with Figure 4.

The displacement signal from generator 11 is fed to grid 14 of tube 15 by way of conductors 12 and 13 which are connected across the primary winding 90 of a transformer 91 having two secondary windings 92 and 93, winding 92 communicating by leads 94 with the grid 14 of tube 15. Secondary winding 93, on the other hand, is center tapped and grounded as shown, and connects by means of leads 95 with grids 96 and 97 of a dual triode tube 98. Plate 99 of the tube connects with one end of a center tapped primary winding 100 of a transformer 101 having two secondary windings 102 and 103 while plate 104 connects with the opposite end of the primary winding. Tube supply is provided by conductors 105 connected with the tube cathodes and a center tap of primary winding 100. The main bridge supply is fed by conductors 64 and 65 while the output leads of the main bridge are constituted by conductors 106 and 107, the former being connected with one of conductors 94 for impressing a signal on grid 14 of tube 15 and the latter being connected with rotor windings 51, one end of the latter being grounded as shown.

Assuming displacement in azimuth, generator 11 develops a signal proportional to such displacement to energize servomotor 43 and operate the control surface. A follow-up signal is developed at rotor winding 51 as a result of servo operation and such signal is fed by way of conductor 107 through the main bridge of the time delay coupling and conductor 106 to be impressed upon the displacement signal on grid 14 of tube 15, such displacement signal through secondary winding 92 to the tube. Assuming, further, a persistent displacement defined by a series of course departures due to given disturbances, the displacement signal will, in addition to being impressed upon grid 14, be also impressed through secondary winding 93 on either grid 96 or 97 so that current will flow at either secondary winding 102 or 103 and, therefore, within its related control bridge. Even though current flow within one of the control bridges does not interact with the current of the main bridge it results in a temperature rise of the arm of the main bridge defined by the particular control bridge having current flow therein to thereby unbalance the main bridge whereby current flow therefrom through conductor 106 to grid 14 of tube 15. The signal of the time delay device represents an average error signal and is impressed upon the displacement and follow-up signal at grid 14 of tube 15 to bring and thereafter maintain the craft on a substantially predetermined course or attitude.

Except for the fact that the present invention provides a novel time delay coupling having a rapid time constant and utilizes a temperature rise characteristic to unbalance a normally balanced electrical network and thus provide a definite time interval between the response of one circuit to the operation of a second circuit, the theory and operation thereof in connection with its application as an automatic trim or anti-hunting provision for aircraft is generally similar to theory and operation of the heat exchange or transfer coupling and its application thereto more fully described in copending application Serial No. 562,823, now Patent Number 2,432,036, reference being made thereto for this purpose.

There has thus been provided by the present invention, a novel time delay coupling having a rapid time constant for injecting a definite time interval between the response of one circuit to the operation of a second and controlling circuit. When applied to an automatic steering or control system for mobile craft, the novel coupling device hereof provides a relatively simple automatic trim provision and/or dampening means for preventing craft hunting about any or all of its axes of control.

Comparison tests for wires of approximately equal diameter on sensitivity and time constant have shown that for equal wattage applied, the arrangement of Figure 3 hereof was substantially thirty times as fast and gave five times the output voltage for one-half the bridge voltage applied to a heat exchange or transfer device of copending application Serial No. 562,823, now Patent Number 2,432,036. Moreover, the time constant of the coupling of Figure 3 can be controlled by the heat capacity of the wire, the supporting mounts and the atmosphere within which it is enclosed.

Although but a single embodiment of the invention has been illustrated and described and its application shown to two specific uses, i. e., automatic trim and anti-hunting for craft automatic steering systems, various changes and modifications in the form and relative arrangement of the parts, which will now appear to those skilled in the art, may be made without departing from the scope of the invention. Reference is therefore to be had to the appended claims for a definition of the limits of the invention.

What is claimed is:

1. In combination with an automatic control device for a craft having a control surface movable with respect thereto for controlling said craft about an axis thereof, a servomotor for operating said surface, reference means on said craft for generating a signal in response to a departure of said craft from a predetermined position to energize said motor, means for producing a follow-up signal upon relative displacement of said surface with respect to said craft for modifying said first signal, time delay means comprising a main normally balanced circuit having connections to a source of current and to said servomotor, a normally balanced control circuit electrically connected to said main circuit which, when energized, undergoes a temperature change to unbalance, after a predetermined lapse of time following its energization, said main circuit to provide a signal for modifying operation of said motor, and means whereby said control circuit is energized by one of said first two named signals.

2. In combination with an automatic control device for a craft having a control surface movable with respect thereto for controlling said craft about an axis thereof, a servomotor for operating said surface, reference means on said craft for generating a signal in response to a departure of said craft from a predetermined position to energize said motor, means for producing a follow-up signal upon relative displacement of said surface with respect to said craft for modifying said first signal, means comprising a main normally balanced bridge circuit having connections to a source of current and to said servomotor, a normally balanced control bridge constituting one arm of said main bridge which, when energized, undergoes a temperature change to unbalance said main bridge to provide a signal for modifying operation of said motor, and means whereby said control bridge is energized by one of said first two named signals.

3. In combination with an automatic control device for a craft having a control surface movable with respect thereto for controlling said craft about an axis thereof, a servomotor for operating said surface, reference means on said craft for generating a signal in response to a departure of said craft from a predetermined position to energize said motor, means for producing a follow-up signal upon relative displacement of said surface with respect to said craft for modifying said first signal, means comprising a main normally balanced bridge circuit having connections to a source of current and to said servomotor, a normally balanced control bridge constituting one arm of said main bridge which, when energized, undergoes a temperature change to unbalance said main bridge to provide a signal for modifying operation of said motor, and means for energizing said control bridge in accordance with the signal of said reference means.

4. In combination with an automatic control device for a craft having a control surface movable with respect thereto for controlling said craft about an axis thereof, a servomotor for operating said surface, reference means on said craft for generating a signal in response to a departure of said craft from a predetermined position to energize said motor, means for producing a follow-up signal upon relative displacement of said surface with respect to said craft for modifying said first signal, means comprising a main normally balanced bridge circuit having connections to a source of current and to said servomotor, a normally balanced control bridge constituting one arm of said main bridge which, when energized, undergoes a temperature change to unbalance said main bridge to provide a signal for modifying operation of said motor, and means for energizing said control bridge in accordance with said follow-up signal.

5. In an automatic control device for a craft having a controlled surface movable with respect thereto for controlling said craft about an axis thereof, a servomotor for operating said surface, reference means on said craft for generating a signal in response to a departure of said craft from a predetermined position to energize said motor, means for producing a follow-up signal upon relative displacement of said surface with respect to said craft for modifying said first signal, means for modifying the operation of said servomotor comprising a normally balanced main bridge and a control bridge forming one arm of the main bridge whereby in response to current flow through said control bridge the temperature thereof is changed to thereby unbalance said main bridge to provide a third signal for said motor, and means responsive to one of said first two mentioned signals for energizing said control bridge.

HARRY CONVISER.

REFERENCES CITED

The following references are of record in the file of this patent:

UNITED STATES PATENTS

| Number | Name | Date |
|---|---|---|
| 1,958,258 | Alexanderson | May 8, 1934 |
| 2,217,254 | Langgasser | Oct. 8, 1940 |
| 2,432,036 | Noxon | Dec. 2, 1947 |
| 2,440,200 | Jofeh | Apr. 20, 1948 |